United States Patent

Howe

[15] 3,695,139
[45] Oct. 3, 1972

[54] QUICK CONNECT COUPLER

[72] Inventor: Wilson S. Howe, 1935 Spruce Avenue, Longmont, Colo. 80501

[22] Filed: March 2, 1970

[21] Appl. No.: 15,613

[52] U.S. Cl. .......................... 85/33, 52/707, 52/708
[51] Int. Cl. ............................................. F16b 37/10
[58] Field of Search ....85/33; 52/704, 707, 708, 709, 52/710, 711; 285/323; 151/19

[56] References Cited

UNITED STATES PATENTS

| | | | |
|---|---|---|---|
| 2,294,745 | 9/1942 | Goetz | 85/33 |
| 3,334,536 | 8/1967 | Armstrong | 85/33 |
| 1,265,064 | 5/1918 | Donley | 52/708 |
| 3,352,341 | 11/1967 | Schentz | 151/19 R |

FOREIGN PATENTS OR APPLICATIONS

| | | | |
|---|---|---|---|
| 624,714 | 6/1949 | Great Britain | 85/33 |
| 72,945 | 12/1947 | Norway | 85/33 |
| 273,110 | 6/1927 | Great Britain | 85/33 |
| 664,178 | 6/1963 | Canada | 52/707 |
| 779,032 | 2/1968 | Canada | 85/33 |

*Primary Examiner*—Edward C. Allen
*Attorney*—Van Valkenburgh and Lowe

[57] ABSTRACT

A quick connect coupler for a threaded bolt. The coupler includes a segmented core within its body having a threaded passageway to receive the bolt. The segments of the core spread apart when the bolt is inserted into the coupler and into the passageway. Then the segments of the core come together to grip the bolt and as the coupler is turned upon the bolt to tighten it, the core within the coupler body wedges against an inclined surface in the body to hold the segments together against a pull of the bolt.

11 Claims, 12 Drawing Figures

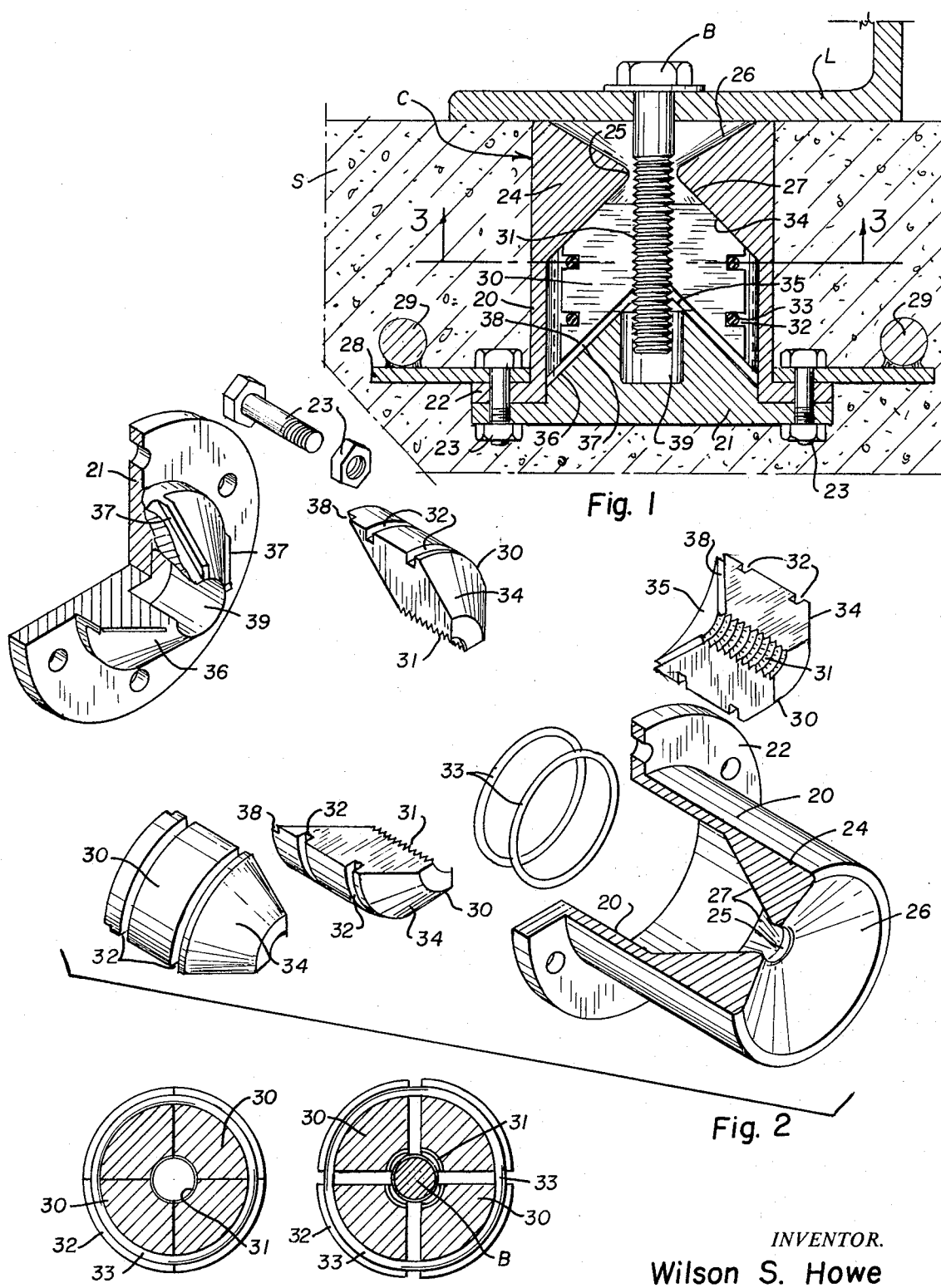

PATENTED OCT 3 1972 3,695,139
SHEET 2 OF 3

INVENTOR.
Wilson S. Howe
BY
Van Valkenburgh & Lowe
ATTORNEYS

PATENTED OCT 3 1972 3,695,139
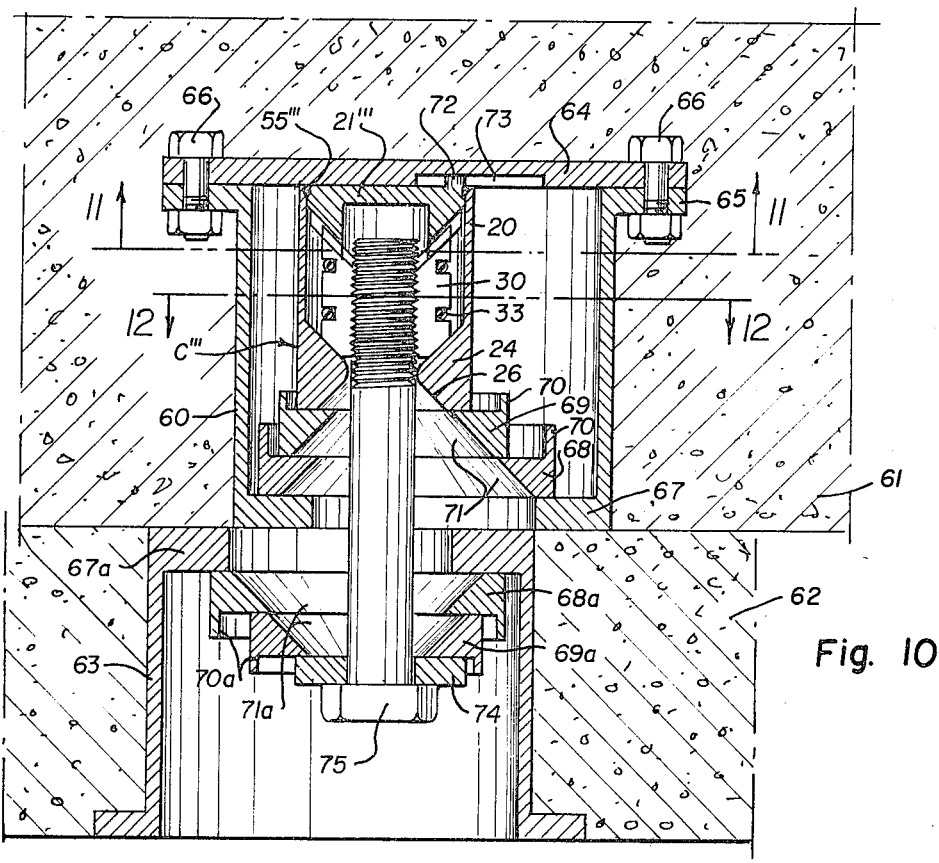
Fig. 10
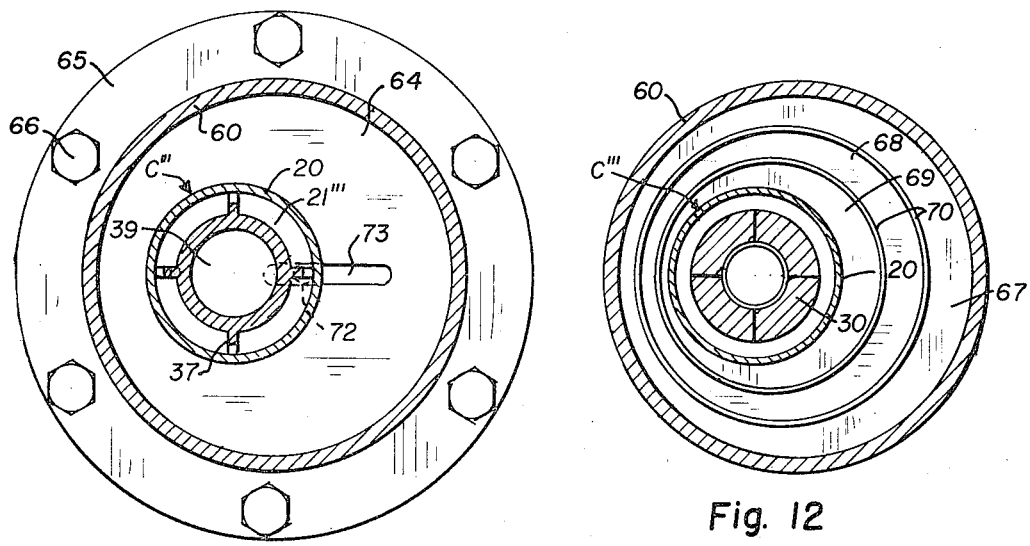
Fig. 11
Fig. 12
INVENTOR.
Wilson S. Howe
BY Van Valkenburgh & Lowe
ATTORNEYS

QUICK CONNECT COUPLER

This invention relates to quick connecting couplers, and more particularly to a quick connecting coupler, or nut, for bolts and threaded studs. As such, the invention will be hereinafter referred to simply as a quick-connect coupler or nut.

There is a need, especially in the construction industry, for couplers which can quickly and easily interconnect two members and then, perhaps later, tightly secure them together. Various types of quick-connect couplers have been proposed for a number of uses, but none have generally replaced or supplanted bolts and nuts, simply because bolts and nuts can provide strong and secure connections and also, they can be tightened or loosened as desired. Thus, even though an attachment by a bolt and nut is slow when a premium is placed upon a workman's time, other types of connectors are usually not as satisfactory.

In addition to a need for a coupler, or nut, which can be quickly interengaged with a bolt, or stud, and thereafter tightened, there is also a need for a substantial amount of slop to allow for misalignment of the holes wherein the bolt and nut are to be fitted. For example, a threaded stud outstanding from a concrete wall or floor surface of a structure will seldom be precisely positioned. Often a stud will be offset from its proper position a quarter or half-inch and sometimes, as much as an inch. This results in a need for self-aligning fasteners and couplers.

The present invention was conceived and developed with the above factors in view and comprises, in essence, a coupler, or nut, for a bolt, or stud, which is adapted to be connected to the bolt by the simple expedient of thrusting the coupler upon the bolt. Thereafter, the coupler may be tightly secured by a partial turn, or a few turns at most, of the coupler upon the bolt or the bolt upon the coupler. This improved coupler nut is especially adapted to be carried in a rigid housing in an arrangement which permits considerable lateral shifting of the nut to accommodate any misalignment of a fixed bolt, or stud.

It follows that an object of the invention is to provide a novel and improved quick-connect coupler, or nut, which can be thrust upon the threaded end of a bolt, or stud, without the need for turning the coupler onto the bolt for engagement therewith.

Another object of the invention is to provide a novel and improved quick-connect coupler, which is engaged onto a bolt by merely thrusting the coupler onto the bolt, and which can then be tightened securely by a partial turn, or a very few turns at most, of the coupler.

Another object of the invention is to provide a novel and improved quick-connect coupler which is extremely versatile in the manner in which it can be used.

Another object of the invention is to provide a novel and improved quick-connect coupler and a self-aligning housing therefor, which will easily align itself with a bolt, or stud, to which it is connected.

Another object of the invention is to provide a novel and improved quick-connect coupler which is especially adapted to be embedded into a concrete wall or floor surface, and is also equally well adapted to be mounted upon or within other types of structural members.

Other objects of the invention are to provide a novel and improved quick-connect coupler, or nut, which is a neat-appearing, simple, economical, reliable, rugged and durable unit.

With the foregoing and other objects in view, as will hereinafter appear, my present invention comprises certain constructions, combinations and arrangements of parts and elements as hereinafter described, defined in the appended claims, and illustrated in preferred embodiment in the accompanying drawings in which:

FIG. 1 is a sectional view of a fragment of the surface portion of a concrete structure showing the improved coupler embedded therein and with a flange of a structural member being secured to the concrete surface by a bolt inserted into the coupler.

FIG. 2 is an exploded isometric view of the coupler shown at FIG. 1.

FIG. 3 is a transverse section of the core of the coupler, as taken from the indicated line 3—3 at FIG. 1.

FIG. 4 is a transverse section of the core, the same as FIG. 3, but showing the manner in which the components of the core separate when a bolt is being inserted therein.

Figure 5:
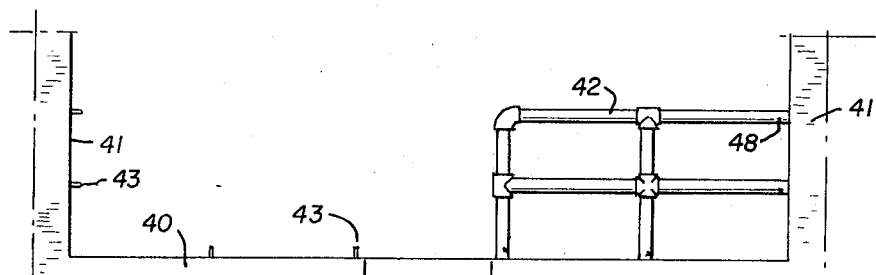
FIG. 5 is a small scale view of a structural deck section where a pipe railing is to be mounted and illustrating such railing in position at one side of the deck and showing studs projecting from the floor and wall at the other side of the deck.

FIG. 10 is a sectional view of a fragment of the surface portion of a concrete structure, similar to FIG. 1, but showing the improved coupler housed within an alignment container which permits the coupler to shift about for alignment with a bolt, and showing further, the surface portion of another structure bolted to the first and with another alignment container to permit a maximum leeway in securing an alignment for connecting the bolt between the two components.

FIG. 11 is a sectional view as taken from the indicated line 11—11 at FIG. 10, with broken lines showing parts hidden from view.

FIG. 12 is a sectional view as taken from the indicated line 12—12 at FIG. 10.

Referring more particularly to FIGS. 1 to 4 of the drawing, the improved bolt coupler C is essentially a nut which receives the threaded shank of a bolt B, the coupler and bolt being used in various connective arrangements by slight modifications as hereinafter described. The components forming this coupler may be made of steel, cast iron, or of any other high quality metal, cast or otherwise formed. The arrangement at FIG. 1 depicts the coupler C embedded in a concrete structure S with the opening face of the coupler being at the surface of the structure to receive the bolt B, the bolt being depicted as holding the leg L of a structural angle.

The coupler C, as shown at FIG. 1, is formed as an axially symmetrical, cylindrical, cup-like unit with a cylindrical body wall 20, open at the face end to receive a bolt and closed at the opposite end by a disc-shaped base 21. This base is secured to the body 20, by being attached to a flange 22 about the end of the wall member as by a ring of bolts 23.

The open face end of the wall 20 is constricted by a toroidal, inwardly-flared neck 24 from the cylinder body diameter approximately four to five times the diameter of the bolt B, to an orifice 25 having a diameter slightly larger than the bolt diameter. The outward face 26 of this neck slopes inwardly into the cup at a comparatively flat angle, in a conical form to facilitate guiding the end of the bolt to the orifice at the center of the unit so the bolt may then be thrust into the body of the coupler past the orifice. The inward surface 27 of this neck slopes oppositely to that of the outward face, as in a conical socket in form, from the inner wall of the cylindrical body 20 to the orifice 25. This surface is smooth and functions as a wedging surface as hereinafter described. It is necessarily sloped at an angle which will permit segments of a core within the body to be wedged together as will be explained, and while this slope will vary depending upon the slipperiness of the material used as the body and core, a slope of 45 degrees, more or less, was found to be generally suitable.

This coupler body 20 with the base 21 secured thereto, may be embedded in the concrete structure S as illustrated at FIG. 1. Ordinarily, this embedment will be reinforced by a plate, such as 28, being secured to the flange 22 as by bolts 23 and welded to reinforcing bars 29 in the concrete as illustrated at FIG. 1.

A holding core 30 is disposed within this body 20 for gripping a bolt thrust into the body as heretofore described. This core is formed of a plurality of segments, as the four illustrated at FIG. 2, and when these segments are fitted together they form a short, cylindrical, axially-symmetrical member whose diameter is less than the inside diameter of the coupler wall 20 to permit them to spread apart as will be explained. An axially centered, threaded passageway 31 extends through the core to hold the threaded end of the bolt B. Circumferential grooves 32 about the cylindrical face of each segment carry tightly fitted O-rings 33 to normally hold the segments of this core together, but permit them to spread apart to receive the bolt when it is thrust into the passageway 31. The leading end 34 of this core 30, adjacent to the neck 24, is conical and is sloped to seat against the conical seating face 27 of the neck. The opposite end of the cylindrical core is concaved as a conical socket 35, to seat upon a conical pyramid on the base, as will be described, to facilitate spreading the segments of the core member when a bolt is pressed against the opposite end of the same.

The disc-shaped base 21, closing the end of the body wall 20, includes a conical pyramid 36 and it is to be noted that the slope of the conical socket 35 of the core 30 and of the pyramid 36 is the same. Thus, these surfaces register and they are comparatively smooth so that one face will slide against the other when a bolt pressing against the core pushes the core against the pyramid to spread the segments apart. The pyramid 36 includes a radial array of splines 37 on its face which register with slots 38 in the core socket 35, with each slot 38 being at a contacting face of the segments of the core as best illustrated at FIG. 2. To complete the base, an axially centered pocket 39 is formed at the apex of the pyramid to receive an end of a bolt extending through the holding core 30.

The operation of this coupler C may now be explained. Whenever the threaded end of a bolt B is thrust past the orifice 25 and into the coupler C, the end of the bolt contacts the core 30 and pushes it against the base pyramid 36. The slope of the threads on the bolt and within the core, and the slope of the socket 35 and pyramid 36 function to spread the segments of the core apart as from the position illustrated at FIG. 3 to that illustrated at FIG. 4. This permits the bolt to be thrust through the core, and any excess of bolt length will move into the pocket 39 at the apex of the pyramid 36, as illustrated at FIG. 1. When so fitted, the O-rings 33 pull the segments of the core about the bolt for a snug fit. The bolt B is then turned to pull the core 30 against the inner seating face 27 of the neck 24 to force the segments of the core against the bolt for a tight, locking fit. The slope of this inner, conical seating face 27 and the mating conical leading end 34 of the core are such as to permit movement of the core segments inwardly and against the bolt to lock it in the core. Ordinarily, the friction between the face 27 and leading end 34 of the core will prevent the core from rotating as it is being tightened; however, the splines 37 which fit in the slots 38 will positively prevent this turning, and will also prevent the core from turning when the bolt is disconnected and turned out of the coupler C.

Figure 6:
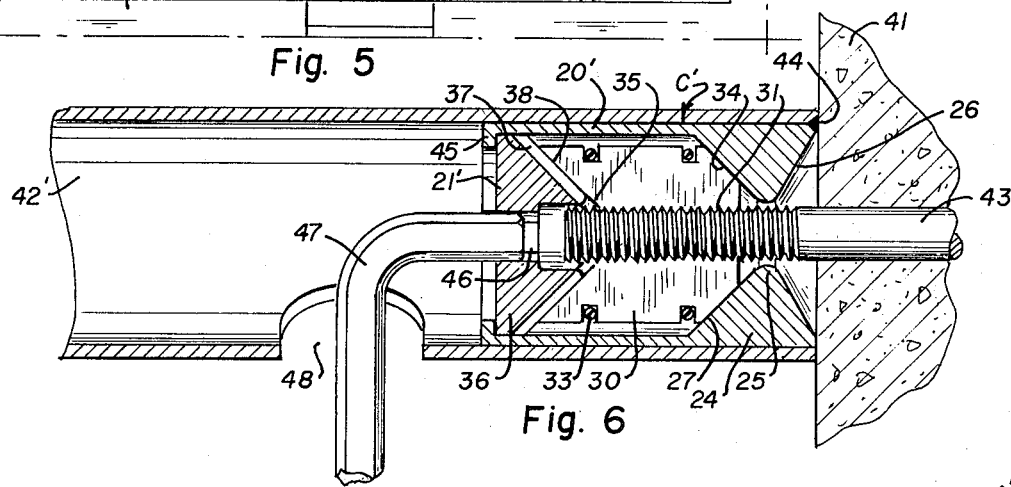
FIG. 6 is an axial sectional view through an end of one of the rail pipes shown at FIG. 5, having a quick-connect coupler welded therein, slightly modified in form, to permit the rail pipe to be mounted upon a stud, and showing further, an opening in the pipe wall to receive a wrench for tightening the coupler.

The coupler C can be used at a number of different types of installations by slight modifications to the structure. FIGS. 5 and 6 illustrate a coupler C' within a pipe, for connecting the end of the pipe to a threaded stud outstanding from a wall surface. FIG. 5 illustrates a portion of a deck 40 having opposing walls 41 in an arrangement where railing sections are desired. One railing section 42, made up of threaded pipe, is illustrated as being in position and studs 43 are illustrated at the other side of the deck for receiving another similar railing section. FIG. 6 illustrates, in detail, in section, an end portion of a pipe 42' of the railing 42 abutted against the wall section 41 with the threaded stud 43 extending into a coupler C' within the pipe with the entrance of the coupler being welded to the end of the pipe as at 44.

This coupler C' is constructed substantially the same as the unit heretofore described, having a cylindrical wall 20, a base 21' to permit the coupler to be tightened and modified as will be described, a neck section 24 at the entrance face reducing the opening to an orifice 25, and having a conical outward face 26 and an inner seating face 27. A cylindrical holding core 30, formed of a plurality of segments, includes a threaded passage 31 to receive the stud 43. The segments of this core are held together by O-rings 33 and it is provided with a conical leading end 34 and conical socket 35 at the opposite end, all the same as heretofore described.

The base 21' is not fixed to the wall 20', but is rotatable therein, and is secured within this cylindrical wall 20' by an inturned flange 45 at the end of the wall 20'. The base is provided with splines 37 and a core with slots 38 as heretofore described, so that the core must rotate when the base 21' is rotated. This provides a means for tightening and loosening the coupler whenever it is fastened to the wall stud 43. To complete the arrangement, the hexagonal socket 46 is formed in the base 21' to receive a hexagonal wrench 47. To provide access, to fit the wrench into the socket for turning, a slot 48 is provided in the pipe behind the coupler.

The manner in which this pipe railing 42 is installed becomes apparent from the foregoing description. The pipe railing, or at least a substantial part of it, may be fitted together prior to its installation in position upon the studs 43 and the actual installation operation will consist in thrusting the ends of the rail section over the studs 43 and then tightening the couplers C' with a socket wrench 47. It is obvious that a coupler C', fitted into the end of a pipe, can be used for a number of purposes. For example, it can be used where pipe sections are to be quickly joined together as in the erection of scaffolds, or also, for the quick erection of an upstanding pole. In the latter instance, however, if the pole can be rotated, the use of a wrench 47 is unnecessary.

Figures 7, 8, 9:
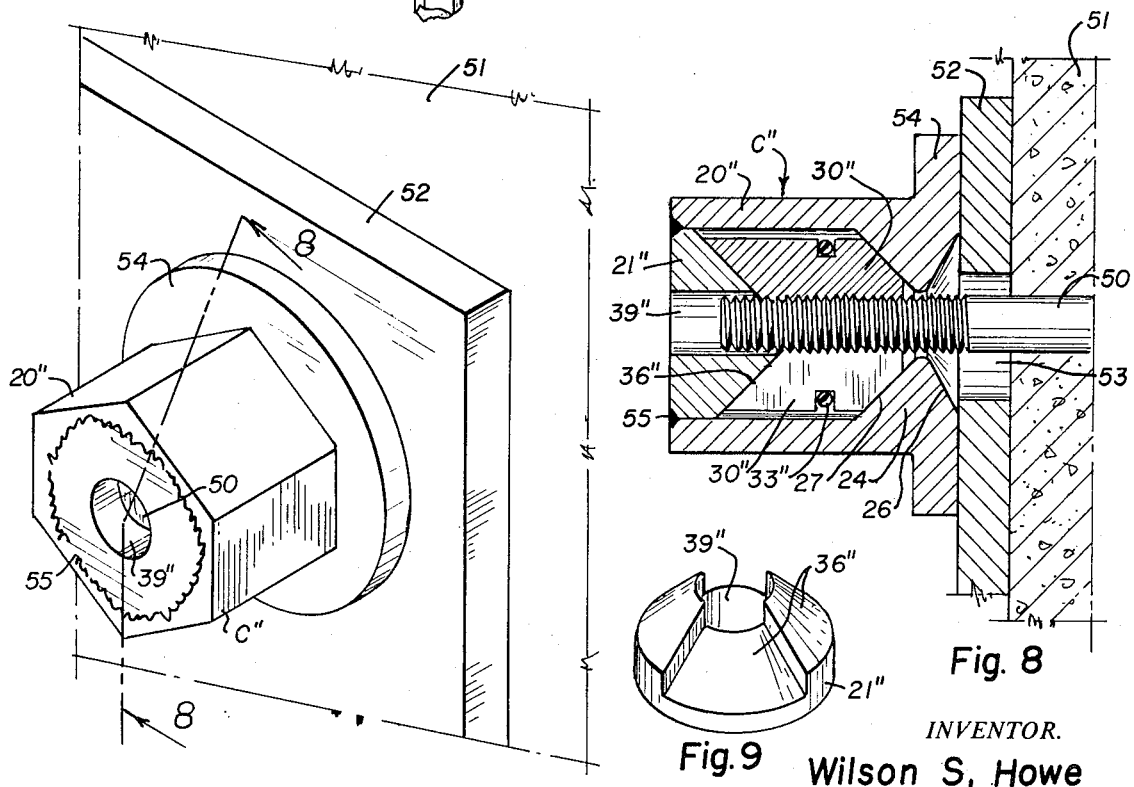
FIG. 7 is an isometric view of a drive nut for fastening a structural member onto a threaded stud projecting from a wall, to illustrate another modified form of the quick-connect coupler.
FIG. 8 is a longitudinal, axial sectional view of the drive nut, as taken from the indicated line 8—8 at FIG. 7.
FIG. 9 is an isometric view of one of the components shown in the unit at FIG. 8, to better exemplify its construction.

A further modification is the coupler C" illustrated at FIGS. 7, 8 and 9, wherein the coupler is formed as a drive nut for fastening a structural member to a bolt or preferably to a threaded stud 50 outstanding from the face of a wall structure 51. A common use of such a drive nut is for connecting a plate 52, or the like, to the stud 50. The plate is fitted onto the wall with the stud extending through a hole 53 to hold the plate in position, and to subsequently tighten it the drive nut C" is thrust upon the projecting stud.

In this modified arrangement, the coupler C", the drive nut, is substantially the same as heretofore described, except the outer wall of the body 20" is hexagonal and preferably, a circular flange 54 extends about the opening face of the nut. The hexagonal section is sized to receive a standard wrench. The entrance face of the coupler is formed with a neck 24 which reduces in diameter to an orifice 25 wherethrough the stud 50 may pass as heretofore described. This neck has an outward conical socket as at 26 to facilitate centering the stud upon it and an inner conical seating face 27 to wedge the holding core 30" in position. This holding core is modified from the unit heretofore described, by using only one O-ring 33" for holding the segments of the core together. Also, as a further variation, the length of the segments of the core 30" varies so that the conical socket portions 35" of each segment are offset to eliminate the splines 37 and slots 38 heretofore described, the base 21" being likewise modified as in the manner illustrated at FIG. 9.

The base 21" is secured to the body 20" as by welding or in any other suitable manner. It is modified by having portions of the conical pyramid 36" offset to accommodate the different lengths of core segments. Also, the pocket 39" extends completely through the base to allow an extra long stud 50 to pass through the nut. The manner in using this drive nut C" is apparent from the description. The plate 52 when attached to a wall is positioned with the stud projecting through it. The drive nut is then pushed over the projecting stud. Finally, the nut is turned a partial turn, or a few turns or at most, until the core 30" wedges tightly between the seating face 27 and the threaded bolt 50 to pull the plate against the wall.

The construction illustrated at FIGS. 10 through 12 provides for a coupler C''' mounted as a component within an embedment container 60 in such a manner as to permit this coupler to be shifted laterally to an off-center position with respect to the container. This lateral variation becomes extremely important in seating and connecting precast wall sections where precise location and alignment of studs and connective holes prior to joining the parts together is next to impossible. Often two registration holes may be offset from each other as much as an inch from their proper position.

This coupler C''' is similar to the couplers heretofore described providing a cylindrical wall 20 having a base 21''' welded to the wall 20 as at 55'''. It is anticipated that the coupler, fitted into the container 60, will be shifted about the container at various positions, but nevertheless, it must be restrained from rotating. To effect this, a stub is provided at the outer face of the base 21 to fit into a slot within the bottom of the container as hereinafter described. The other components within this coupler, such as the neck 24 and the core 30, are the same as heretofore described.

FIG. 10 illustrates a fragment of a concrete structure 61 wherein the container 60 is embedded, and a fragment of a second concrete wall structure 62 wherein a similar container 63 is embedded for holding the head of a nut as will be described. The container 60, a cylindrical cuplike unit, has its open face at the surface of the structure 61 and has a closed bottom 64 within the structure. This bottom is secured to the container as by connecting it to a flange 65 outstanding from the end of this container as by a ring of bolts 66. This container may be reinforced in its embedment by connecting it to reinforcing rods in any suitable manner, not shown.

The open end of this container is reduced in diameter by an inturned seating flange 67 to provide a seating shoulder for adjusting rings. In the unit illustrated, a pair of slide rings 68 and 69, of decreasing diameter, are placed upon the flange 67 with the larger ring 68 being seated upon the flange 67, the smaller ring 69 being seated upon the larger, and with the coupler C''' being seated upon the smaller to extend between this smaller ring and the bottom 64. Each ring is formed with a peripheral fence 70 upstanding from the seating surface thereof. The fence of the larger restrains the smaller and the fence of the smaller restrains the coupler C''' which is within it.

The openings 71 through these rings are conical and inclined at an angle of approximately 45 degrees with each having a diameter such that the position of the coupler may be adjusted by shifting it about the smaller ring, the position of the smaller ring may be adjusted by shifting it about the larger ring and the position of the larger may be adjusted by shifting it about the flange 67, all to provide an offset position such as that illustrated and at the same time, still provide sloping surfaces at these openings which will direct a nut into the coupler C'''.

Accordingly, whenever a bolt is thrust into this container and into the coupler C''', the slide rings 68 and 69 will be shifted to a position to permit the bolt to move past them and then the coupler itself will be shifted to a position to receive the bolt. The bolt may then be turned to tighten the assembly. To prevent rotation of the coupler C''' when the bolt is being turned, a stub 72 outstands from the outer face of the base 21''' to extend into a slot 73 in the coupler bottom 64, the slot being proportioned in any suitable manner to permit the coupler to shift and swing about it, but to prevent the coupler from actually rotating.

Where an even greater degree of the shifting of the register position for bolting two members together is needed, than that which is possible by the use of a container 60, a second container 63 may be embedded in the opposing member 62. This container is necessarily an open, cylindrical member. It includes, however, an inturned flange 67a at the face of the structure 62 which contacts the face of the structure 61 carrying the container 60, the flange 67a being similar to the flange 67 and contacting it. A pair of slide rings 68a and 69a, which may be the same as a slide ring 68 and 69 heretofore described, is mounted upon the inner face of the seating plate 67, the larger slide ring 68a being against the face and the larger 69a being against the smaller. Fences 70a are also provided as hereinafter described. A washer 74 is mounted against the smaller slide ring 69a and a connective bolt 75 extends through this washer from the container 63, into the container 60 and into a coupler C''' as illustrated. It is to be noted that with this compound arrangement, a considerable offset from a theoretically registered alignment of the members is possible. Also, it is to be noted that the container 63 must be opened at both ends as illustrated, in order to permit a workman to reach the head of the bolt 75 to tighten the assembly once it is fastened together.

While I have now described several variations and alterations of my invention, it is apparent that others skilled in the art can build and devise alternate and equivalent constructions which are nevertheless within the spirit and scope of my Invention. Hence, I desire that my protection be limited, not by the constructions illustrated and described, but only by the proper scope of the appended claims.

I claim:

1. A quick connect nut for attachment with the threaded shank of a bolt by thrusting the same thereon, and comprising in combination therewith:
    a. a body having: a passageway therein with an opening at one end to receive the end of a bolt shank; an enlarged cavity within this body having a base opposite the opening; a frusto-conical surface within the cavity axially congruent with the passageway axis and having its apex end at the opening to form a necked-in inclined seating surface; and, a second frusto- conical surface at least as steep as the first mentioned conical surface upstanding from the base of the cavity, axially congruent with the passageway axis with its apex end pointed towards the opening to form an inclined guiding surface;
    b. a segmented core within the aforesaid cavity having: an axial length substantially the same as that of the cavity; a threaded passageway therethrough aligned with the body passageway; a conical surface at the end adjacent to the aforesaid seating surface to substantially co-mate therewith; and, a conical cavity at the opposite end to substantially co-mate with the aforesaid guiding surface, said core being divided into a plurality of longitudinal segments, said core having a diameter less than the diameter of the cavity to permit the segments to spread apart when the end of the aforesaid bolt shank is thrust into the end of the passageway from the body opening, by movement of the segments along the conical guiding surface in the direction of the thrust of the bolt; and,
    c. a resilient means to normally hold the segments together, whereby the segments oppose the thrust of the end of the bolt to be thereby spread by the movement of the segments against the guiding surface at one end and the movement of the bolt into the segments at the other end thereof.

2. In the organization defined in claim 1 including radially disposed lugs upstanding from the conical base and slots in the conical cavity of the core adapted to receive the aforesaid lugs, whereby to prevent the turning of the core within the cavity.

3. In the organization defined in claim 1 including a passageway through the base to permit a bolt thrust into the body from the aforesaid opening to extend completely through the body.

4. In the coupler defined in claim 11, wherein said core is substantially circular and said resilient means comprises a band encompassing the core.

5. In the organization defined in claim 11, including a means within the cavity adapted to permit the core segments therein to spread apart, but to prevent the segments from rotating.

6. In the organization set forth in claim 1 wherein said body is hexagonal in shape to receive a wrench.

7. In the organization set forth in claim 11, wherein said body includes a flanged means adapted to facilitate securing the same to a concrete structure.

8. In the organization set forth in claim 11, wherein said body includes a conical, funnel-like surface at the opening adapted to facilitate centering a bolt within the coupler.

9. In the organization set forth in claim 5, wherein said means includes a means for rotating the core within the body to tighten a bolt.

10. In the organization set forth in claim 11, wherein said body is carried within a container having an enlarged opening therein and shiftable rings between the body and the opening adapted to permit the body to shift to various locations within the container to receive a bolt out of normal alignment therewith.

11. In the organization set forth in claim 1 wherein the body is formed as two components with the cavity and the seating surface being one component and with the base being the second component and being securely affixed into the end of the body.

* * * * *

UNITED STATES PATENT OFFICE
CERTIFICATE OF CORRECTION

Patent No. 3,695,139  Dated October 3, 1972

Inventor(s) Wilson S. Howe

It is certified that error appears in the above-identified patent and that said Letters Patent are hereby corrected as shown below:

Column 7, line 44, "Invention" should be -- invention --. Column 8, lines 33, 36, 42, 45 and 52 of Claims 4, 5, 7, 8 and 10 respectively, should read -- claim 1 -- instead of "claim 11".

Signed and sealed this 13th day of February 1973.

(SEAL)
Attest:

EDWARD M. FLETCHER, JR.　　　　　ROBERT GOTTSCHALK
Attesting Officer　　　　　　　　　Commissioner of Patents